United States Patent [19]

Brightful et al.

[11] Patent Number: 4,926,784
[45] Date of Patent: May 22, 1990

[54] PET DEODORIZER DEVICE

[76] Inventors: Deborah S. Brightful; Charles E. Brightful, Jr., both of 46 Woodleaf, Pittsford, N.Y. 14534

[21] Appl. No.: 362,009
[22] Filed: Jun. 5, 1989
[51] Int. Cl.$^5$ ............................................. A01K 27/00
[52] U.S. Cl. ....................................... 119/106; 119/156
[58] Field of Search ................. 119/106, 156; 206/372

[56] References Cited

U.S. PATENT DOCUMENTS

| 2,565,887 | 8/1951 | Salfisberg | 206/812 |
| 2,791,202 | 5/1957 | Doyle | 119/156 |
| 2,808,030 | 10/1957 | Costanzo | 119/106 |
| 3,491,726 | 1/1970 | Partin | 119/106 |
| 3,687,114 | 8/1972 | Berkstopesser | 119/106 |
| 3,799,118 | 3/1974 | Sandefur | 119/106 |
| 3,889,804 | 6/1975 | Ravich | 206/812 |
| 3,995,598 | 12/1976 | Gardner et al. | 119/106 |
| 4,409,116 | 10/1983 | Lodico | 206/812 |
| 4,558,663 | 12/1985 | Kaplanis | 119/106 |
| 4,651,874 | 3/1987 | Nakamura | 206/812 |
| 4,749,080 | 6/1988 | Toohey | 206/210 |

Primary Examiner—Paul J. Hirsch
Attorney, Agent, or Firm—Lean Gilden

[57] ABSTRACT

A pet deodorizer device is set forth provided with an elongate cylindrical canister formed with an integral elongate flexible hinge securing an overlying lid to enclose the canister. The canister is provided with a matrix of through-extending apertures with a solid bar of a deodorizing agent positionable and replaceable within the canister. The deodorizing agent is formed within a transparent flexible packaging material with a tear strip removably securable to the package whereupon removal of the tear strip releases the deodorizing agent through the slot created by the tear strip and ultimately through the apertures to the associated pet. The hinge securing the lid to the canister is provided with an annular spring ring of a diameter less than the lid and the canister to enable securement of the canister to an associated pet collar. A modification of the invention includes an elongate flexible strap integrally secured to a rear surface of the canister to enable securement of the device to collars of varying widths.

1 Claim, 1 Drawing Sheet

U.S. Patent May 22, 1990 4,926,784
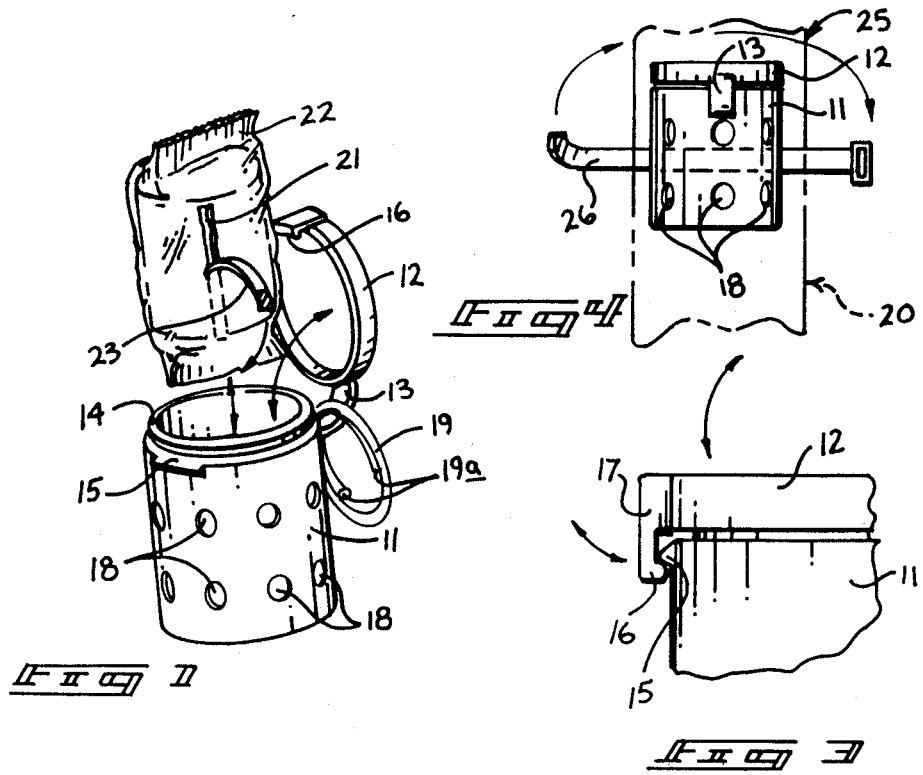
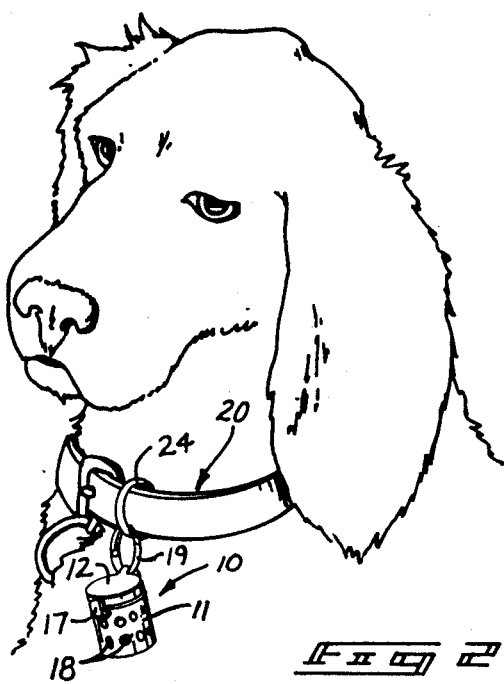

PET DEODORIZER DEVICE

BACKGROUND OF THE INVENTION

1. Field of the Invention

The field of invention relates to pet deodorizing devices, and more particularly pertains to a new and improved pet deodorizer device wherein the same is securable in combination with a pet collar and provided with replaceable solid deodorant bars to effect distribution of the deodorizing agent to the associated pet.

2. Description of the Prior Art

The use of pet and animal deodorizing agents, as well as other chemical distribution apparatus, have been utilized in the prior art. Prior art devices have typically been of a non-reusable or of a structure lacking durability or effectiveness in operation. The instant invention attempts to overcome the prior art devices by setting forth a reasonable canister of unique organization, particularly oriented towards the distribution of a deodorizing agent onto the associated animal employing a solid bar of deodorant securable within a hermetically sealed package until use is desired. Examples of prior art devices include U.S. Pat. No. 4,091,766 to Colliard setting forth a pet collar, including a neck embracing member, provided with a strip of absorbent material impregnated with an insecticide or deodorant material. The collar is of a construction not easily enabling replenishment of the chemical deodorant or insecticide in use.

U.S. Pat. No. 4,208,986 to Costanzo sets forth a collar provided with an elongate housing provided with opposite ends and including a deodorizing material wherein the housing is fixedly secured to the collar inhibiting the effective and ready distribution of a deodorizing agent.

U.S. Pat. No. 4,338,886 to McBride provides a predator control collar including a plurality of toxic filled pouches fillable with a pesticide. The pouches are positioned about an elastic strap for securement to an ear of livestock and are of elasticity to expand with the increase of the size of the animal's neck as the animal grows to maturity. The device is of remote organization, as utilized by the instant invention, but is of interest relative to the distribution of a pesticide-type collar for use with an animal.

U.S. Pat. No. 4,355,599 to Fickes, et al., sets forth a flea collar utilizing a container of liquid flea repellant with an adjustable collar formed of absorbent material to receive the repellent. The patent is of interest relative to the use of replenishable collars for the distribution of a chemical to an associated animal, but the liquid repellent used by the Fickes patent fails to provide the enduring longevity of the solid bar deodorant, as set forth by the instant invention.

U.S. Pat. No. 3,477,409 to Costanzo sets forth a collar attachment formed as an elongate housing provided with loops through terminal ends of the housing for receiving a collar therethrough with a chemical secured within the housing for distribution to the associated animal. The collar of the Costanzo patent fails to provide the replenishment aspect of the instant invention, as well as the loosely dangling organization relative to an associated collar to enhance distribution of the chemical deodorant to the animal.

As such, it may be appreciated that there is a continuing need for a new and improved pet deodorizer device wherein the same addresses both the problems of ease of use and effectiveness of construction, and in this respect the present substantially fulfills this need.

SUMMARY OF THE INVENTION

In view of the foregoing disadvantages inherent in the known types of pet deodorizing devices now present in the prior art, the present invention provides a pet deodorizing device wherein the same may be readily secured and loosely mounted to an animal collar for effective distribution of a deodorizing agent to the associated animal. As such, the general purpose of the present invention, which will be described subsequently in greater detail, is to provide a new and improved pet deodorizing device which has all the advantages of the prior art pet deodorizing apparatus and none of the disadvantages.

To attain this, the present invention comprises a pet deodorizing device provided as an elongate cylindrical canister formed with a matrix of through-extending apertures formed with a rim extending upwardly of the canister for engagement with the interior surface of a lid hingedly mounted to the canister for securement of a solid bar of deodorant agent with the canister. The deodorizing agent is provided within a transparent flexible hermetically sealed covering with a tear strip thereon to enable removal of the tear strip for release of the agent through the apertures and onto the associated animal. The canister is mounted to the collar by means of an annular spring ring of a diameter less than that of the canister and associated lid for confinement of the lid to an elongate flexible hinge mounting the lid to the canister. The ring enables the canister to dangle about the collar and enhance distribution of the deodorizing agent to the animal. A modified form of the invention includes an elongate flexible strap fixedly and diametrically directed across a rear surface of the canister.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pet deodorizing device which has all the advantages of the prior art pet deodorizing devices and none of the disadvantages.

It is another object of the present invention to provide a new and improved pet deodorizing device which may be easily and efficiently manufactured and marketed.

It is a further object of the present invention to provide a new and improved pet deodorizing device which is of a durable and reliable construction.

An even further object of the present invention is to provide a new and improved pet deodorizing device which is susceptible of a low cost of manufacture with regard to both materials and labor, and which accordingly is then susceptible of low prices of sale to the consuming public, thereby making such pet deodorizing devices economically available to the buying public.

Still yet another object of the present invention is to provide a new and improved pet deodorizing device which provides in the apparatuses and methods of the prior art some of the advantages thereof, while simultaneously overcoming some of the disadvantages normally associated therewith.

Still another object of the present invention is to provide a new and improved pet deodorizing device wherein the same provides for selective release of a deodorizing agent in solid stick form through an elongate dangling canister about the neck of an associated animal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the instant invention secured to an associated collar.

FIG. 3 is an orthographic view, partially in section, of the lid securement portion of the apparatus.

FIG. 4 is a rear orthographic view of a modification of the instant invention with a strap integrally secured to a rear surface of the canister.

DESCRIPTION OF THE PREFERRED EMBODIMENT

With reference now to the drawings, and in particular to FIGS. 1 to 3 thereof, a new and improved pet deodorizing device embodying the principles and concepts of the present invention and generally designated by the reference numeral 10 will be described.

More specifically, the pet deodorizing device 10 essentially comprises an elongate cylindrical canister 11 of a first diameter provided with a cup-shaped lid 12 including a flexible elongate hinge 13 integrally secured to the canister at an upper portion of the first diameter of the canister at one end of the hinge and secured to a downwardly depending skirt of the lid at the other end of the hinge. The canister includes an annular rim 14 of a second diameter less than the first diameter formed integrally to an upper end of the canister of a height substantially equal to the downwardly depending skirt of the lid whereupon the upper surface of the rim provides an abutment surface and positioning for the lid wherein the lid is of a diameter equal to the first diameter to provide a relatively continuous exterior surface when the lid 12 is secured overlying the annular rim 14. An arcuate flange 15 is integrally secured to and extends orthogonally outwardly of the canister diametrically opposed to the hinge 13 whereupon a leg 17 extends downwardly from the skirt and is secured to the skirt of the lid 12 diametrically opposed to the securement point of the hinge includes an inwardly extending tab 16 to engage the flange 17, as illustrated in FIG. 3.

The canister 11 is provided with a matrix, including plural rows of through-extending apertures 18, extending through the wall of the canister 11. A circular spring wound ring 19 provided with terminal ends 19a and of a diameter less than the diameter of the lid 12 or the first diameter of the canister 11 to capture the ring 19 onto the elongate flange 15. The ring 19 enables securement of the canister 11 and associated lid 12 to the pet collar 20 in a suspended dangling fashion. The dangling securement of the canister to the pet collar 20 of the associated pet "P" enables the enhanced distribution of a solid bar of deodorizing agent 21 secured within the canister and replaceable therewithin to enhance distribution of the deodorizing agent 21 onto the pet due to the normal agitation of the canister 11 and associated deodorizing agent captured therewithin resulting from the animal's normal animated movements.

The deodorizing agent 21, as noted, is set forth as a solid bar to provide a prolonged distribution of deodorant to the associated animal and is secured within a transparent heremetically sealed covering 22. The covering 22 is provided with a tear strip 23 that is removable to enable escape of the deodorizing agent through the slot created by the removal of the tear strip 23 within the covering 22.

A collar ring 24 is normally secured about the collar 20 to receive the ring 19, as illustrated in FIG. 2, wherein the collar ring enables the canister 11 to agitate in a more productive manner, as discussed above, to promote distribution of the chemical deodorizing agent through the apertures 18. Further, the cylindrical configuration of the canister 11 and associated lid 12 and its relatively continuous surface defined by the lid and canister of a single diameter defined by a first diameter, minimizes irritating contact of the canister with the animal "P" as the canister is suspended from the collar 20. Further, the canister is formed of either stainless steel or polymeric materials of durable and weather resistant qualities.

FIG. 4 is illustrative of a modified pet deodorizer 25 utilizing the canister 11 and lid 12 construction of FIGS. 1-3, but wherein a flexible elongate polymeric strap 26 is fixedly secured to and diametrically directed across a rear surface of the canister 11 aligned with the hinge 13. The strap 26 includes a buckle at one end for engagement with the second end of the strap. The elongate strap enables securement of the invention about collars 20 of varying widths, and enables the canister 11 to be positioned more closely to the collar in association therewith.

As to the manner of usage and operation of the instant invention, the same should be apparent from the above description, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A pet deodorizing device comprising, in combination, a pet collar, and an elongate cylindrical canister including a first diameter surface for receiving a cup-shaped lid thereto wherein said lid is hingedly mounted to said canister first diameter surface, and a solid chemical member replaceably positioned within said canister, and a securement means for securing said canister to said collar, and wherein said canister includes an annular rim of a second diameter less than said first diameter formed to said canister for receiving the lid, said lid is formed of a diameter equal to said first diameter and is of a cup-shaped configuration to receive said rim therewithin, said rim being of a height substantially equal to a downwardly extending skirt of said lid, and wherein said lid includes a downwardly extending leg with an inwardly directed tab securable to an outwardly extending flange integrally formed to the canister to selectively latch said lid to said canister, and wherein said lid is hingedly mounted to said canister including an elongate flexible hinge secured to said canister at the first diameter surface at one end and to the skirt of the lid at its other end, and wherein the leg is secured to said lid diametrically opposed to the hinge, and the flange secured to the first diameter surface diametrically opposed to the hinge, and wherein the canister is formed with a matrix of through-extending apertures formed through the first diameter surface to enable distribution of a vapor provided by the chemical member onto an associated animal, and wherein the chemical member comprises a deodorizing agent, and the chemical member is secured within a hermetically sealed flexible covering, the flexible covering formed with a removable tear strip to enable the vapor to be directed through the covering and through the apertures of the canister, and wherein securement means includes an annular spring ring slidably mounted onto said elongate flexible hinge securing the lid to the canister and defined by a further diameter less than said first diameter to capture the ring means on the hinge, and further comprising a collar ring mounted on the collar and the ring means mounted on the collar ring to suspend the canister from the collar, and wherein said securement means includes an elongate flexible strap orthogonally directed across a rear surface of the canister, and the strap being connected to the canister in alignment with said elongate flexible hinge securing the lid to the canister.

* * * * *